United States Patent [19]

Kemper

[11] Patent Number: 4,495,829
[45] Date of Patent: Jan. 29, 1985

[54] POWER DRIVE LINE HAVING A WIDE RANGE OF SPEED RATIOS

[75] Inventor: Yves J. Kemper, Birmingham, Mich.

[73] Assignee: Ipanema Company, Birmingham, Mich.

[21] Appl. No.: 335,510

[22] PCT Filed: May 19, 1980

[86] PCT No.: PCT/US80/00584

§ 371 Date: Dec. 23, 1981

§ 102(e) Date: Dec. 23, 1981

[87] PCT Pub. No.: WO81/03370

PCT Pub. Date: Nov. 26, 1981

[51] Int. Cl.³ .............. F16H 15/16; G05G 1/00; F16H 47/08; F16H 37/06
[52] U.S. Cl. .............. 74/191; 74/572; 74/688; 74/690; 74/730; 74/740; 192/3.21; 192/3.28
[58] Field of Search ............ 74/190, 190.5, 191, 74/193, 214, 216, 572, 688, 690, 740, 212, 796, 677, 730, 731, 732, 330; 192/3.21, 3.26, 3.28-3.31

[56] References Cited

U.S. PATENT DOCUMENTS

| Re. 30,981 | 6/1982 | Kemper | 74/193 |
|---|---|---|---|
| 2,062,901 | 12/1936 | Grahm | 74/796 |
| 2,239,983 | 4/1941 | Bade | 74/796 |
| 2,240,148 | 4/1941 | Schmitter et al. | 74/796 |
| 2,243,224 | 5/1941 | Schmitter et al. | 74/796 |
| 2,580,392 | 1/1952 | Bade | 74/796 |
| 2,755,683 | 7/1956 | Ryan | 74/472 |
| 2,883,883 | 4/1959 | Chillson | 74/796 |
| 3,084,569 | 4/1963 | Hause | 74/688 |
| 3,299,744 | 1/1967 | Kraus | 74/690 X |
| 3,410,146 | 11/1968 | Nordeen | 74/730 |
| 3,420,122 | 1/1969 | Okabe | 74/796 |
| 3,618,423 | 11/1971 | Chery | 74/796 X |
| 3,628,398 | 12/1971 | Chery | 74/688 |
| 3,670,595 | 6/1972 | Chery | 74/796 X |
| 3,677,109 | 7/1972 | Stuemky | 74/796 |
| 3,688,594 | 9/1972 | Weber | 74/191 |
| 3,886,810 | 6/1975 | Sugiyama et al. | 74/572 X |
| 4,112,779 | 9/1978 | Kemper et al. | 74/191 |
| 4,112,780 | 9/1978 | Kemper et al. | 74/191 |
| 4,131,171 | 12/1978 | Keyes | 74/572 X |
| 4,152,946 | 5/1979 | Kemper | 74/793 |
| 4,233,851 | 11/1980 | Kemper | 74/690 X |
| 4,233,859 | 11/1980 | Kemper | 74/690 |
| 4,238,976 | 12/1980 | Kemper | 74/690 X |
| 4,258,581 | 3/1981 | Kemper et al. | 74/192 |
| 4,277,982 | 7/1981 | Kemper | 74/193 X |
| 4,369,667 | 1/1983 | Kemper | 74/192 |
| 4,378,708 | 4/1983 | Pouliot | 74/191 |

FOREIGN PATENT DOCUMENTS 706329  4/1941  Fed. Rep. of Germany .
2033034  5/1980  United Kingdom .

Primary Examiner—Allan D. Herrmann
Assistant Examiner—Stephen B. Andrews
Attorney, Agent, or Firm—Ziems, Walter & Shannon

[57] ABSTRACT

A power drive line in which a continuously variable, nutating traction drive transmission unit (16) is combined with a single planetary set (84, 86, 88) to provide two forward modes and a reverse mode of drive line operation. A pair of transmission unit input shafts (18, 20) are alternatively coupled to a power input to the overall drive line. In one forward mode, the planet gear (86) is driven by the sun gear (84) to rotate the ring gear (88) in a relatively wide low speed range of speed ratios. In another forward mode, the transmission body (52) carrying the planet gear (86) is connected to be driven directly by the drive line power input to effect a relatively high range of output speeds for a given input speed. In the reverse mode, the body (52) carrying the planet gear (86) is held against planetary movement so that the planet gear (86) operates as a reversing idler between the sun gear input (84) and the ring gear output (88).

13 Claims, 7 Drawing Figures

FORWARD

REVERSE
($\dot{\alpha}=0$)

LOW $$\frac{\dot{\theta}_1}{\dot{\theta}_2} = \frac{1-K_1\rho}{1-K_2\rho}$$

HIGH $$\frac{\dot{\alpha}}{\dot{\theta}_2} = \frac{1}{1-K_2\rho}$$

REVERSE $$\frac{\dot{\theta}_1}{\dot{\theta}_2} = \frac{1}{K_3}$$

POWER DRIVE LINE HAVING A WIDE RANGE OF SPEED RATIOS

BACKGROUND OF THE INVENTION

This invention relates to mechanical power transmission systems and more particularly, it concerns an improved drive line or train by which power developed by an engine may be transmitted through a wide range of continuously variable speed ranges.

In light of recent interest in fuel and energy conservation, the automotive industry has and continues to place increasing emphasis on reducing the weight and aerodynmic drag of automotive vehicles as well as on smaller and more efficient engines. Also, it is generally recognized that the operating efficiency of a given engine can be increased and correspondingly, the fuel consumption reduced, by increasing the range of speed ratios available in the drive line between the engine and the driving axle of a vehicle. For example, automotive drive lines have traditionally included multispeed transmissions to provide a range of speed ratio reductions on the order of 2 or 2.5:1 to 1:1 and a final drive gear reduction at the driving axle approximating 4:1 to provide a total speed reduction range in the drive line on the order of 8 or 10:1 to 4:1. The trend recently has been to increase this range particularly at the high speed end to provide an overdrive at the transmission output shaft for the reason that at cruising or highway speeds, where the demand for power is minimum, greater efficiency can be achieved with slower engine operating speeds than are possible with traditional speed ratio reductions. Yet, the large speed ratio reduction is required at the low speed end of the range in order to develop adequate torque for low speed operation.

It is apparent, therefore, that increasing the range of speed ratios available in a given transmission can be significant in reducing the fuel consumption of an automotive vehicle. On the other hand, increasing the speed ratios available in a gear-type transmission requires the addition of gears, shafting and control components which, in turn, add to the size and weight of the transmission. The problems associated with increased size and weight are particularly accute in front-wheel drives where the engine and transmission must be accommodated in a relatively small space.

The potential for increasing the range of speed ratios in an automotive drive line by using a continuously variable transmission unit (CVT) either along or in combination with gearing has been recognized by the automotive industry. Moreover, the state-of-the-art relating to CVT units has been advanced to a refined stage particularly in the development of a type of transmission represented by the disclosures of U.S. Pat. Nos. 4,112,779 and 4,112,780, both issued Sept. 12, 1978 and in U.S. Pat. No. 4,152,946 issued on May 8, 1979. In the type of transmission exemplified by these patents, three frame supported working bodies operate to transmit a mechanical power input to a rotatable output at continuously variable output/input speed ratios within the design range of the transmission. For purposes of definition in this background discussion as well as in the ensuing detailed description of the present invention and in the appended claims, the three working bodies may be termed respectively, and "alpha body" which is supported by the transmission frame to be concentric with a first axis, a "beta body" which is concentric with a second axis inclined with respect to and intersecting the first axis at a point of axes intersection, and an "omega body" carried by or forming part of the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

In the operation of such transmissions where an input drives the alpha body at a speed ($\overset{\circ}{\alpha}$) to carry the beta body in nutation; the omega body is held against rotation; the beta body is linked with an output shaft rotatable at the speed ($\overset{\circ}{\theta}$) on a first axis by gearing having a ratio factor (k); and the radius ratio of the traction surfaces on the beta and omega bodies is a variable factor ($\rho$); the output/input speed ratio of the unit is determined by an equation:

$$\overset{\circ}{\theta}/\overset{\circ}{\alpha} = 1 - k\rho.$$

The performance characteristics of such transmissions are described in an article entitled: "Performance of a Nutating Traction Drive" by P. Elu and Y. Kemper, paper no. 80-C2/DET-63, the American Society of Mechanical Engineers. In this Article, it is noted that extremely high overall efficiencies are possible by appropriate selection of the gear ratio factor (k) though with a corresponding reduction in the transmission speed ratio range (e.g., 2.8/1.9 or 1.5 vs.0.43/0 or ∞). While a transmission which can achieve a zero output for any given input speed would, in theory, be an ideal solution to an automotive drive line because it might be combined with external gearing to provide an infinite range of speed ratios, a more practical solution lies in expanding the finite ratio ranges of such a CVT where high overall power transmitting efficiencies can be attained.

The development of drive lines using CVT units of the type described has been developed further to include inertial drive lines in which the wide range of continuously variable speed ratios may be used to transmit power directly from an engine or from a flywheel coupled with the transmission input. A clutch between the flywheel and the crank shaft of an internal combustion engine, for example, enables the flywheel to be used both as an energy storing device and as a crank shaft flywheel for the engine. The clutch is coupled at all times for rotation with the engine crank shaft when the engine is operated but allows the engine to be shut off when a kinetic energy stored in the flywheel is adequate either for restarting the engine or for propelling the vehicle. Such a drive line is disclosed in U.S. National Application Ser. No. 06/023,398, filed Mar. 23, 1979, by Yves Jean Kemper now U.S. Pat. No. 4,393,964. Corresponding National Applications have been filed in all countries designated in this International Application.

SUMMARY OF THE INVENTION

In accordance with the present invention, an extremely compact automotive drive line is provided by which a wide total range of substantially continuous speed ratios are attainable in two stages or modes of drive line operation to yield a single rotational direction of power output. In addition, a reverse mode of drive line operation is provided with a single or fixed reduction ratio and a kinetic energy storing flywheel may be included in the drive line to enable the use of both regenerative braking and engine restarting after termination of engine operation when adequate kinetic energy has been stored in the flywheel.

These features are achieved as a result primarily of an unique organization of a continuously variable transmission unit and a single planetary gear set in which an outer or ring gear is coupled at all times with the drive line output. The transmission includes one working body rotatable on a first axis, another working body rotatable on a second axis revolvable about the first axis and variable means for controlling relative movement of the bodies of these two bodies. The planet gear of the gear set is rotatable with and carried by the revolvable body. A pair of transmission unit input shafts are connected one directly to the working body rotatable on the first axis and the other directly with the sun gear of the planetary set. The respective unit input shafts are connected by coupling devices with a power input in a manner to effect a low drive line speed ratio when the power input is coupled with the sun gear, a high drive line speed ratio range when the power input is coupled with the working body rotatable about the first axis. A reverse range is effected by holding the second axis against revolution about the first axis so that the planet gear remains stationary as a reversing idler with a sun gear input and a ring gear output.

A primary object of the present invention is to provide a highly compact drive line having a wide range of continuously variable speed ratios and which may be accommodated by a relatively small number of easily controlled components. Other objects and further scope of applicability will be apparent from the detailed description to follow taken in conjunction with the accompanying drawings in which like parts are designated by like reference numerals.

DETAILED DESCRIPTION OF THE PREFERRED EMBODIMENT

Figure 1:
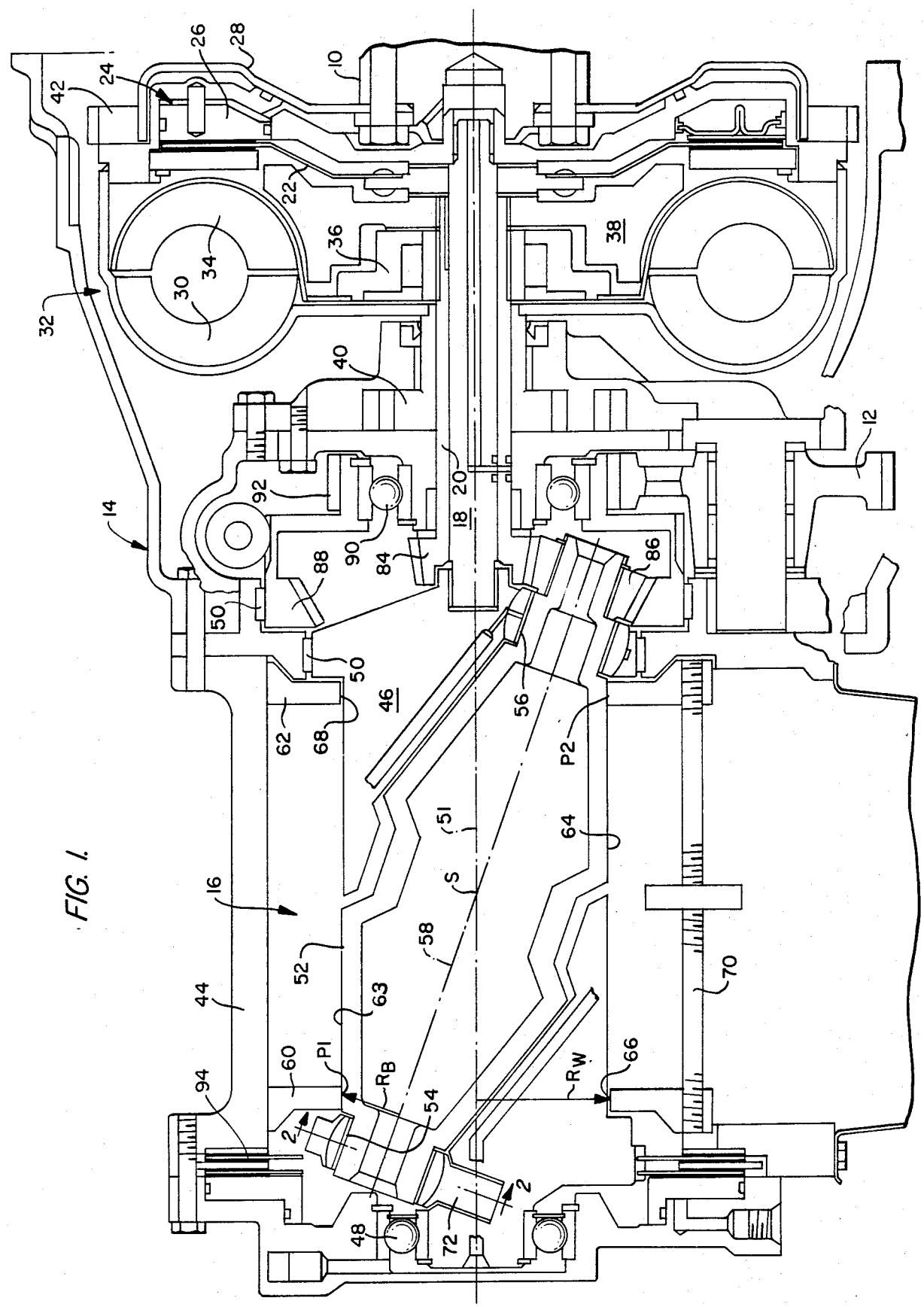
FIG. 1 is a cross-section on a vertical plane containing the primary axis of a drive line in accordance with the present invention.

In FIG. 1, the structural components of a preferred embodiment of a drive line in accordance with the present invention are shown by which a rotatable power input at a hub 10 is transmitted to a power output at a driven pinion gear 12. Although the source of input power is not shown, it will be readily understood by those skilled in the art that the hub 10 may be connected directly to the crank shaft of an internal combustion engine, for example. It may be assumed further that the connection of the hub 10 to the engine crank shaft preferably, but not necessarily, is without the customary crank shaft flywheel used to maintain continuity of power impulses developed by a piston-type engine.

While many of the components illustrated in FIG. 1 will be described in detail below, it will be noted preliminarily that all components are contained in a rigid though multipart external housing 14 and include a CVT unit 16 having concentric inner and outer input shafts 18 and 20. The inner shaft 18 is keyed or otherwise coupled for direct rotation with the driven disc 22 of a releasable friction clutch 24 having a hydraulically actuated driving plate assembly 26 coupled with the power input hub 10 by a torque transmitting plate or spider 28.

The plate 28 is coupled directly and permanently with the driving impeller 30 of a conventional hydraulic torque coupler 32, the output or driven component 34 of which is connected to the outer CVT unit input shaft 20 by an overrunning or freewheeling clutch 32. The clutch 36 is conventional and for purposes of the present invention, it is necessary to understand only that the clutch 36 will transmit torque from the coupler 32 to the shaft 20 but will not transmit torque in the opposite direction or from the shaft 20 to the coupler 32. In other words, torque will not be transmitted between the driven member 34 of the coupling 32 and the shaft 20 when the rotational speed of the shaft exceeds that of the member 34.

A flywheel 38 is splined or otherwise coupled for rotation directly with the outer shaft 20 and although located between the hydraulic coupling 32 and the clutch 24 in the illustrated embodiment, may be located anywhere along the length of the shaft 20. Other components included in the illustrated drive line between the hub 10 and the CVT unit 16 include an oil pump 40 connected directly to the input impeller 30 of the hydraulic coupling 32 and thus driven at all times with the power input hub 10 and a lightweight starting ring gear 42 coupled to and supported by the torque plate 28. Though not illustrated in the drawing, it will be appreciated that an electric starter motor may be used to drive the ring gear 42 during initial starting of an engine having its crank shaft connected to the hub 10.

The CVT unit is of a general class disclosed in the previously mentioned U.S. patents. Moreover, certain features of the specific CVT unit illustrated in the drawing form the subject matter of two concurrently-filed U.S. patent applications, Ser. No. 348,938, entitled "Continuously Variable Transmission Unit" and Ser. No. 336,399, entitled "Torque Transmitting Body for Traction Drive Transmissions and Normal Friction Force Developing Method", the name of the inventor in both applications being Yves Jean Kemper. While reference may be made to these concurrently-filed International Applications for a more complete description of details and for an explanation of operating principles, the unit 16 will be summarily described herein sufficient for one to understand fully the operation of the illustrated drive line.

The CVT 16 is contained within a generally cylindrical frame 44 bolted or otherwise rigidly connected with the casing 14 and like the transmission units of the class previously described, includes three primary working bodies. The first of such bodies is an alpha body 46 supported from the frame 44 by bearings 48 and 50 to be rotatable about a first transmission axis 51; the second is a biconical beta body 52 supported rotatably by the alpha body 46 by way of bearings 54 and 56 for rotation about a second axis 58; and the third is an omega body constituted by a pair of omega rings 60 and 62 which are coupled against rotation by the frame 44 but which are slidable axially along the first axis 51. The beta body 52 in the illustrated embodiment is an integral component defining a pair of oppositely convergent, frusto-conical.

rolling or traction surfaces 63 and 64 of revolution about the second axis 58. The omega rings 60 and 62, in turn, define interior rolling or traction surfaces 66 and 68 of revolution about the first axis 51. Also it will be noted that the second axis 58 intersects the first axis 51 at a point S of axes intersection and the apical half angle of the conical surfaces 63 and 64 is equal to the angle at which the first and second axes intersect.

The rolling surfaces 63, 64 and 66, 68 are retained in rolling friction engagement with each other at two diametrically opposite points P1 and P2 in a plane containing the first and second axes 51 and 58. Also, the ratio of the radius $R_w$ of the surfaces 66 relative to the ratio $R_b$ of the conical surfaces 63 and 64 at the points P1 and P2 may be made to vary by moving the omega rings 60 and 62 toward and away from the point S of axes intersection. This ratio function or $R_w/R_b$ is designated herein and in all equations by the Greek letter ($\rho$). Movement of the rings 60 and 62 along the axis 51 to vary the radius ratio is effected by an oppositely pitched screw 70 coupled to an appropriate control such as an electric motor.

Figure 2:
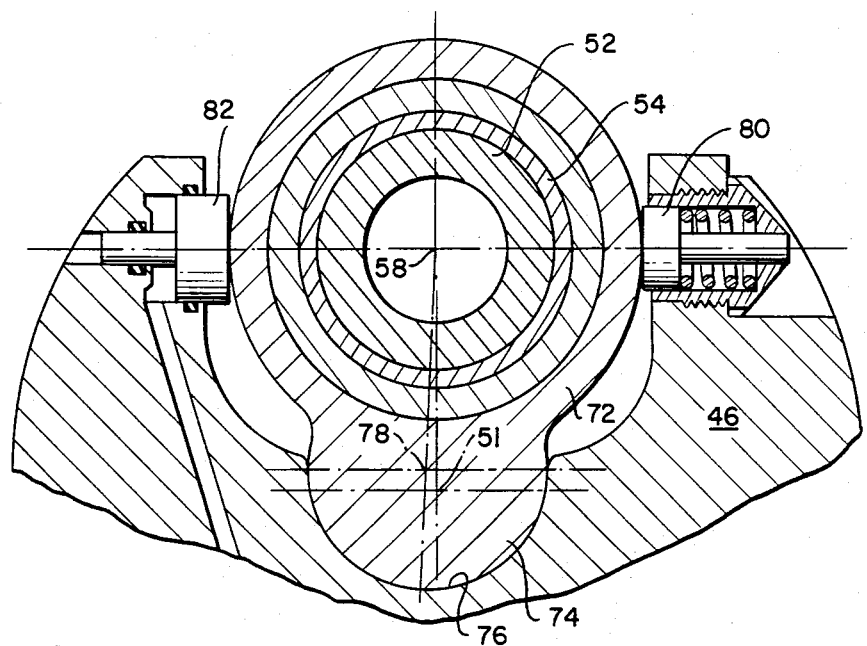
FIG. 2 is an enlarged fragmentary cross-section on line 2—2 of FIG. 1.

Although the manner in which the traction surfaces 63 and 64 on the beta body 52 or beta surfaces are held in engagement with the surfaces 66 and 68 on the omega rings or omega surfaces is fully described and explained in the aforementioned concurrently filed application Ser. No. 336,399, this feature will be briefly summarized herein. The bearings 54 and 56 supporting the beta body 52 from the alpha body 46 are hydrodynamic radial bearings and, as such, are concentric with the second axis 58 at all times. These bearings, however, permit a slight axial freedom of the beta body 52 along the second axis 58 and also allow pivotal freedom in a sphere concentric with each point of bearing support. The bearing 54 at one end of the beta body is carried from the alpha body 46 by an eccentric 72 shown most clearly in FIG. 2. The member 72 includes a semicircular lobe 74 which bears against a complementing semicircular recess 76 in the alpha body so that the member 72 is pivotal in relation to the alpha body about an axis 78 which is eccentric to the rotational axis of the alpha body 46 or the first axis 51. In the orientation illustrated in FIG. 2, it will be seen that if the alpha body is rotated in a clockwise direction, and such rotation is reacted to by the beta body 52, the torque between the alpha body and the beta body will result in a torque component tending to displace the second axis 58 into a steeper angle of inclination with respect to the first axis 51. Because of the facility for the beta body 52 to move axially in the bearings 54 and 56, this force will be reacted to by the engagement of the beta surfaces with the omega surfaces and a corresponding self-centering of the beta body on the point S. In addition, a pre-load bias is provided by a spring plunger 80 whereas an unloading plunger 82 actuated by an appropriate hydraulic system (not shown) may be used to hold the beta and omega surfaces out of frictional or torque transmitting engagement with each other. In other words, the unloading plunger 82 may be used to decouple the traction surfaces 63, 64 and 66, 68 from torque transmitting engagement with each other and thus place the CVT unit 16 in a "neutral" condition.

Continuously variable speed power transmission in two operating modes is contemplated by the present invention. In one mode of operation, input torque at the outer shaft 20 is transmitted to a sun gear 84 machined integrally on the shaft 20 or otherwise keyed for direct rotation therewith. The sun gear 84 meshes with a planet gear 86 rotatable with and carried by the beta body 52 for rotation on the second axis 58 and for orbital movement of the second axis 58 about the first axis 51. The planet gear 86 meshes with a bevelled internal ring gear 88 supported by a bearing 90 from the frame 44 for rotation about the first axis 51. The ring gear 88 carries a driving pinion 92 which is in mesh at all times with the output pinion 12. The characteristics of this mode of operation are described fully in the aforementioned concurrently filed U.S. application Ser. No. 348,938.

In a second mode of operation, torque at the inner shaft 18 is transmitted directly to the alpha body 46 as a result of the inner shaft 18 being splined for rotation with the alpha body 46. In this mode of operation, power is transmitted by movement of the planet gear 86 to the ring gear 88 as a result of movement of the planet gear which is a combination of orbital movement at the speed ($\overset{\circ}{\alpha}$) of the alpha body 46 and rotational movement of the beta body or ($\overset{\circ}{\beta}$) about the second axis 58. In both of the described modes of operation, the unit 16 operates as a speed reducer in separate but substantially contiguous ranges of continuously variable speed ratios and in which the output pinion 12 is rotated in the same direction.

A third mode of operating the unit 16 is possible as a result of the organization of the planet gear set including the sun gear 84, planet gear 86 and ring gear 88 together with the capability of the unit 16 for achieving a neutral condition in which the traction surfaces 62, 64 and 66, 68 are retained out of torque transmitting engagement. To this end, a friction clutch 94 is provided to releasably couple the alpha body 46 with the frame 44. When the clutch 94 is engaged to ground the alpha body to the frame 44 and the unloading plunger 82 actuated to withdraw the traction surfaces from torque transmitting engagement at the points P1 and P2, rotation of the outer shaft 20 and the sun gear 84 will impart a reverse rotation of the ring gear 88 using the planet gear 86 as a reversing idler.

Figure 3:
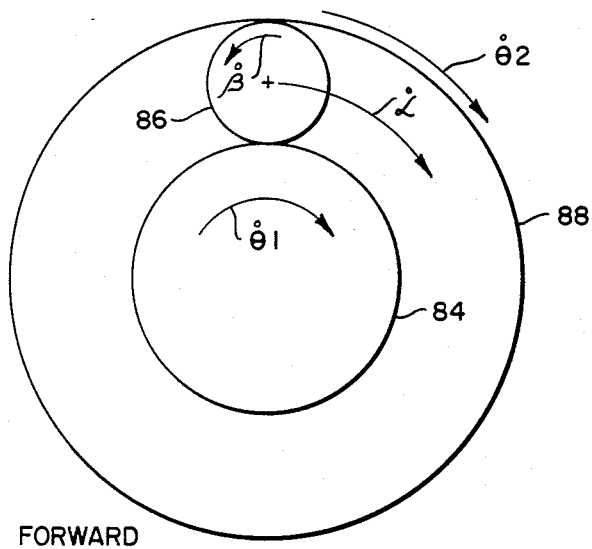
FIGS. 3 and 4 are schematic diagrams illustrating relative directions of certain rotatable components in the drive line of FIG. 1.
Figure 4:
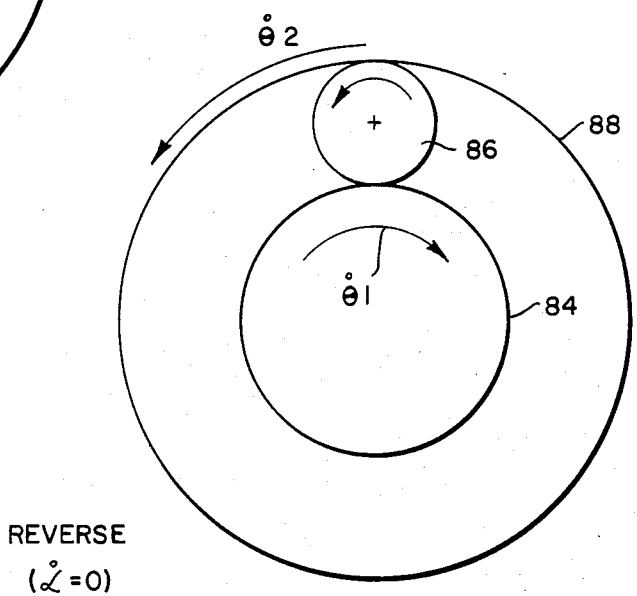

The relative directions of component rotation in the three modes described are shown in FIGS. 3 and 4 of the drawings. Thus, in FIG. 3, where the input is supplied either by direct rotation of the alpha body 46 at a speed ($\overset{\circ}{\alpha}$) or by the outer shaft 20 driving the sun gear 84 at a speed $\overset{\circ}{\theta}1$, the ring gear 88 will be rotated at a speed $\overset{\circ}{\theta}2$ and in the direction of the arrows shown in FIG. 3. In FIG. 4, where the alpha body 46 is held against rotation ($\overset{\circ}{\alpha}=0$) an input at $\overset{\circ}{\theta}1$ will result in an output again at the ring gear and at a velocity $\overset{\circ}{\theta}2$ but in a direction of rotation opposite from that of the previous modes.

Figure 5:
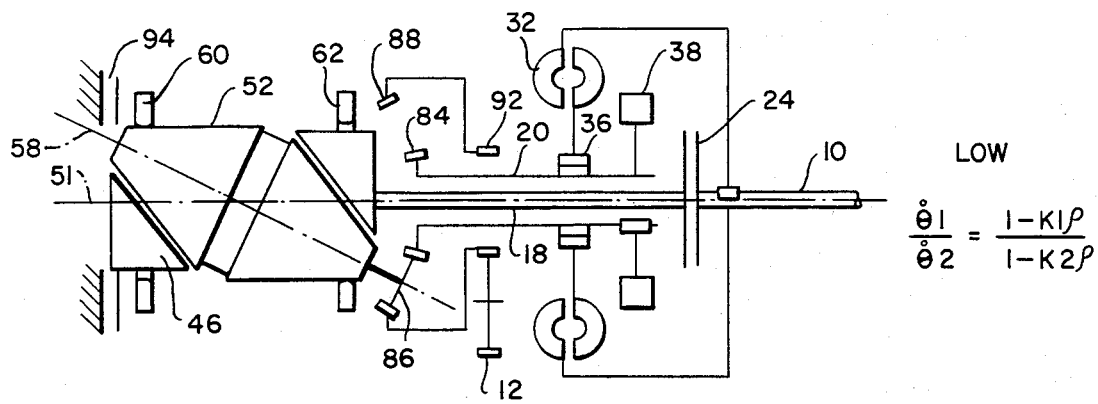
FIGS. 5-7 are schematic views representing alternative modes of drive line operation.
Figure 6:
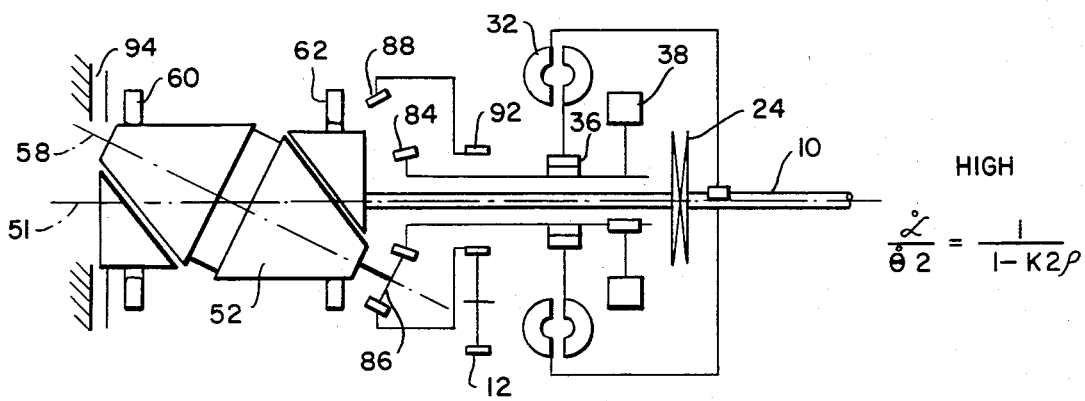
Figure 7:
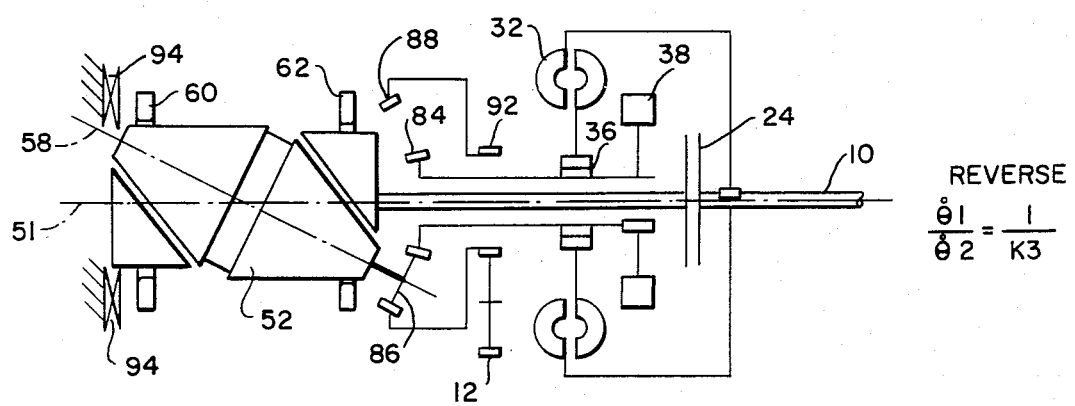

The three modes of operation of the drive line are further depicted in FIGS. 5, 6, and 7 of the drawings. To facilitate an understanding of the various modes of operation, physical parameters of the CVT unit which are established in a given unit design include a range of radius ratios ($\rho$), a gear reduction factor k1 which is the diameter of the sun gear 84 divided by the diameter of the planet gear 86; a gear reduction factor k2 which is the diameter of the planet gear 86 divided by the diameter of the ring gear 88 and a gear reduction factor k3 which is the diameter of the sun gear 84 divided by the diameter of the ring gear 88. For illustrative purposes, it may be assumed that the function $\rho$ may be made to vary between a numerical value of 1.08 and 2.31; that k1 is equal to a −1.6; that k2 is equal to a +0.32; and that k3 is equal to −0.52.

Given the aforementioned parameters, it will be seen that operation in a "low" range of output speeds may be effected by decoupling the friction clutch 24 and by transmitting power from the input hub 10 through the hydraulic torque coupling 32 to the outer shaft 20 and the sun gear 84. The speed ratio equation for this mode of operation is included in FIG. 5 and with the parameters given, will provide an input/output or reduction ratio range of from 18:1 to 4:1 by shifting the omega rings 60 and 62 from the small end of the conical surfaces 63 and 64 ($\rho=2.31$) to the large end of the conical surfaces ($\rho=1.08$).

A "high" range of forward output speed is achieved by engaging the friction clutch 24 to drive the inner shaft 18 and the alpha body at a speed ($\overset{\circ}{a}$). During this time, the outer shaft 20 will be rotated at speeds faster than the speed of the alpha body to store energy in the flywheel 38. This will have no effect, however, on the hydraulic coupling 32 because of the freewheeling clutch 36 which prevents transmission of torque from the shaft 20 back to the coupling 32. Speed ratios in the high range may be varied in accordance with the equation given in FIG. 6. Specifically, by adjusting the rings 60 and 62 in a direction toward the center of the unit 10, the input/output speed ratios may be varied from approximately 3.8:1 to 1.5:1. Quite obviously, by selection of an appropriate final reduction gearing the speed ratio of 1.5:1 may be converted to an overdrive in the context of an automotive drive line.

In the reverse mode of operation, the friction clutch 24 is disengaged, the alpha body grounding clutch 94 is engaged and the direction of the output will be reversed as aforementioned in a speed ratio range equal to k3. Which because the sun gear is of smaller diameter than the ring gear 88 will be less than 1 or a speed reduction.

Energy stored in the flywheel 38 may be transmitted back to the engine crank shaft by engaging the friction clutch 24 or may be transmitted to the power output 12 through the transmission unit in the mode of operation illustrated in FIG. 5. Also, it will be noted that the wide range of continuously variable speed ratios provided by this mode of operation will accommodate relatively high speed rotation of the flywheel. Because the sun gear is in engagement at all times with the planet gear and thus included at all times in the drive line to the output gear 12 transmission of kinetic energy from the flywheel to the output is a function solely of the position of the rings 60 and 62.

Having described the preferred embodiment of the present invention, it is contemplated that modifications and/or changes may be made in the described embodiment without departure from the present invention. It is expressly intended, therefore, that the foregoing description and accompanying drawings are illustrative of a preferred embodiment only, not limiting, and that the true spirit and scope of the present invention will be determined by reference to the appended claims.

I claim:

1. A drive line comprising:

a continuously variable transmission unit having an alpha body rotatable on a first axis, a beta body rotatable on a second axis revolvable about said first axis, said beta body being carried by said alpha body so that said second axis is inclined with respect to and intersects said first axis at a point of axes intersection, said beta body having at least one rolling beta surface of revolution about said second axis, and variable means for controlling relative movement of said bodies, said variable means including means defining at least one rolling omega surface of revolution about said first axis, means to retain said beta and omega surfaces in rolling friction contact and means to vary the radius ratio of one of said beta and omega rolling surfaces to the other of said rolling surfaces;

planetary gear means including a sun gear rotatable on said first axis, a ring gear rotatable on said first axis and planet gear means in mesh with said sun and ring gears, said planet gear means being coupled for rotation with and carried on said other working body;

a power input;

a power output drivably connected to said ring gear; and means for coupling said power input to one or the other of said sun gear and said alpha body to provide a low drive line speed ratio range when said power input is coupled with said alpha body, the speed ratio in each of said ranges being determined by said variable means.

2. A drive line as recited in claim 1, wherein said planetary gear means comprises a single planetary set in which said planet gear means is a single gear.

3. A drive line as recited in claim 1, wherein said ring gear carries a driving pinion gear and wherein said power output comprises a driven pinion gear in mesh with said driving pinion.

4. A drive line as recited in claim 1, including a flywheel connected for direct rotation with said sun gear.

5. A drive line as recited in claim 1, wherein said means for coupling said power input to one or the other of said sun gear and said one working body comprises concentric inner and outer shafts, said outer shaft being connected to said sun gear and said inner shaft being connected to said one working body.

6. A drive line as recited in claim 5, comprising a releasable clutch to connect said power input and said inner shaft, and a torque coupling to connect said power input and said outer shaft, said torque coupling including means to prevent transmission of torque from said sun gear and said outer shaft to said power input at least when said releasable clutch is engaged.

7. A drive line as recited in claim 6, including a flywheel mounted on said outer shaft for rotation therewith at all times.

8. A drive line as recited in either of claims 1 or 2, wherein said power input and said power output are rotatable in a given direction of rotation in both said low and high speed ratio ranges.

9. A drive line as recited in claim 8, including means to reverse said given direction of rotation in said power output relative to said power input.

10. A drive line as recited in claim 9, wherein said means to reverse comprises means to retain said second axis against revolution about said first axis whereby said planet gear means operates as an idler between said sun and ring gears when said power input is connected to said sun gear.

11. A drive line comprising:

a continuously variable transmission unit having one working body rotatable on a first axis, another working body rotatable on a second axis revolvable about said first axis and variable means for controlling relative movement of said bodies;

planetary gear means including a sun gear rotatable on said first axis, a ring gear rotatable on said first axis and planet gear means in mesh with said sun and ring gears, said planet gear means being coupled for rotation with and carried on said other working body;

a power input;

a power output drivably connected to said ring gear;

means for coupling said power input to one or the other of said sun gear and said one working body to provide a low drive line speed ratio range when said power input is coupled to said sun gear and a high drive line speed ratio range when said power input is coupled with said one working body, the speed ratio in each of said ranges being determined by said variable means; and a flywheel connected for direct rotation with said sun gear.

12. A drive line comprising:

a continuously variable transmission unit having one working body rotatable on a first axis, another working body rotatable on a second axis revolvable about said first axis and variable means for controlling relative movement of said bodies;

planetary gear means including a sun gear rotatable on said first axis, a ring gear rotatable on said first axis and planet gear means in mesh with said sun and ring gears, said planet gear means being coupled for rotation with and carried on said other working body;

a power input;

a power output drivably connected to said ring gear;

means for coupling said power input to one or the other of said sun gear and said one working body to provide a low drive line speed ratio range when said power input is coupled to said sun gear and a high drive line speed ratio range when said power input is coupled with said one working body, the speed ratio in each of said ranges being determined by said variable means;

said means for coupling said power input to one or the other of said sun gear and said one working body comprising concentric inner and outer shafts, said outer shaft being connected to said sun gear and said inner shaft being connected to said one working body;

a releasable clutch to connect said power input and said inner shaft, and a torque coupling to connect said power input and said outer shaft, said torque coupling including means to prevent transmission of torque from said sun gear and said outer shaft to said power input at least when said releasable clutch is engaged; and a flywheel mounted on said outer shaft for rotation therewith at all times.

13. A drive line comprising:

a continuously variable transmission unit having one working body rotatable on a first axis, another working body rotatable on a second axis revolvable about said first axis and variable means for controlling relative movement of said bodies;

planetary gear means including a sun gear rotatable on said first axis, a ring gear rotatable on said first axis and planet gear means in mesh with said sun and ring gears, said planet gear means being coupled for rotation with and carried on said other working body;

a power input;

a power output drivably connected to said ring gear;

means for coupling said power input to one or the other of said sun gear and said one working body to provide a low drive line speed ratio range when said power input is coupled to said sun gear and a high drive line speed ratio range when said power input is coupled with said one working body, the speed ratio in each of said ranges being determined by said variable means;

said power input and said power output being rotatable in a given direction of rotation in both said low and high speed ratio ranges; and means to reverse said given direction of rotation in said power output relative to said power input and comprising means to retain said second axis against revolution about said first axis whereby said planet gear means operates as an idler between said sun and ring gears when said power input is connected to said sun gear.

* * * * *

UNITED STATES PATENT AND TRADEMARK OFFICE
CERTIFICATE OF CORRECTION

PATENT NO. : 4,495,829
DATED : January 29, 1985
INVENTOR(S) : Yves J. Kemper

It is certified that error appears in the above—identified patent and that said Letters Patent is hereby corrected as shown below:

Column 8, Claim 8, line 1, "either of claims 1 or 2," should be "claim 1,".

Signed and Sealed this

Seventeenth Day of September 1985

[SEAL]

Attest:

DONALD J. QUIGG

Attesting Officer

Commissioner of Patents and Trademarks—Designate